United States Patent
Takashima et al.

(10) Patent No.: US 8,922,423 B2
(45) Date of Patent: Dec. 30, 2014

(54) RADAR APPARATUS AND METHOD OF DETECTING TARGET OBJECT

(75) Inventors: Tetsuya Takashima, Nishinomiya (JP); Takuo Kashiwa, Nishinomiya (JP)

(73) Assignee: Furuno Electric Company Limited, Nishinomiya (JP)

(*) Notice: Subject to any disclaimer, the term of this patent is extended or adjusted under 35 U.S.C. 154(b) by 472 days.

(21) Appl. No.: 13/299,986

(22) Filed: Nov. 18, 2011

(65) Prior Publication Data
US 2012/0127024 A1 May 24, 2012

(30) Foreign Application Priority Data
Nov. 19, 2010 (JP) ................................ 2010-258864

(51) Int. Cl.
*G01S 13/42* (2006.01)
*H01Q 3/30* (2006.01)
*H01Q 3/04* (2006.01)

(52) U.S. Cl.
CPC ............... *G01S 13/428* (2013.01); *H01Q 3/30* (2013.01); *H01Q 3/04* (2013.01)
USPC .......................................... 342/146; 342/133

(58) Field of Classification Search
CPC .................................................. G01S 13/428
USPC ....................................................... 342/129
See application file for complete search history.

(56) References Cited

U.S. PATENT DOCUMENTS

| | | | |
|---|---|---|---|
| 3,017,630 A | | 1/1962 | Begovich et al. |
| 3,648,285 A | * | 3/1972 | Sanders ........................ 342/33 |
| 3,938,149 A | * | 2/1976 | Grantham ...................... 342/94 |
| 3,971,020 A | * | 7/1976 | Howard ........................ 342/129 |
| 4,204,342 A | * | 5/1980 | Linfield ........................... 434/2 |
| 4,814,779 A | * | 3/1989 | Levine .......................... 343/754 |
| 5,066,956 A | | 11/1991 | Martin |
| 5,748,140 A | | 5/1998 | Schober |
| 7,196,653 B2 | * | 3/2007 | Hall et al. .................... 342/25 F |
| 7,268,723 B2 | * | 9/2007 | Sanyal .......................... 342/120 |
| 7,764,223 B2 | * | 7/2010 | Wade ............................ 342/107 |
| 8,306,747 B1 | * | 11/2012 | Gagarin et al. ................ 701/514 |
| 8,362,946 B2 | * | 1/2013 | Bishop et al. ................. 342/179 |
| 8,362,948 B2 | * | 1/2013 | Kolinko et al. ............... 342/179 |
| 2007/0152868 A1 | * | 7/2007 | Schoebel ........................ 342/70 |
| 2008/0266171 A1 | | 10/2008 | Weber et al. |
| 2009/0079620 A1 | | 3/2009 | Van Caekenberghe et al. |
| 2014/0076985 A1 | * | 3/2014 | Pettersson et al. .............. 239/11 |

FOREIGN PATENT DOCUMENTS

| | | | |
|---|---|---|---|
| DE | 19906149 A1 | 9/2000 | |
| GB | 1005379 | * 9/1965 | ............... H01Q 3/26 |
| GB | 1207604 | 10/1970 | |
| JP | 10-62527 A | 3/1998 | |
| JP | 11-325896 A | 11/1999 | |
| JP | 3122389 B2 | 1/2001 | |
| JP | 3559236 B2 | 8/2004 | |
| JP | 2008-14874 A | 1/2008 | |
| JP | 2010-525336 A | 7/2010 | |

OTHER PUBLICATIONS

European Search Report for corresponding application No. 11188473.0, dated Feb. 21, 2012.

\* cited by examiner

*Primary Examiner* — Matthew M Barker
(74) *Attorney, Agent, or Firm* — Birch, Stewart, Kolasch & Birch, LLP

(57) ABSTRACT

This disclosure provides a radar apparatus, which includes an antenna for discharging a transmission beam with frequencies corresponding to elevation/depression angles with respect to a particular surface and receiving a reflection echo from a reflective body and a reception module for detecting an elevation/depression angle of the reflective body based on a frequency component of a reception signal received by the antenna and detecting a distance of the reflective body based on a time component of the reception signal.

9 Claims, 15 Drawing Sheets

RADAR APPARATUS AND METHOD OF DETECTING TARGET OBJECT

CROSS-REFERENCE TO RELATED APPLICATION(S)

The application claims priority under 35 U.S.C. §119 to Japanese Patent Application No. 2010-258864, which was filed on Nov. 19, 2010 the entire disclosure of which is hereby incorporated by reference.

TECHNICAL FIELD

The present invention relates to a radar apparatus and a method of detecting a target object in a surrounding area while rotating an antenna, and especially relates to a radar apparatus and a method of detecting a target object that are used in a transportation equipment that moves (rolls, pitches), such as a ship.

BACKGROUND OF THE INVENTION

Generally, in radar apparatuses, a electromagnetic wave is discharged and the reflection wave is received, therefore a target object (a ship or a buoy on the sea) is detected. Further, the detected target object is displayed on a display screen. Particularly for such a radar apparatus that is used in a transportation equipment that moves (rolls, pitches), such as a ship, in many cases, a fan beam type radar apparatus disclosed in JP3,559,236, which has directivity that is wide in a vertical direction so as to help capturing such a target object even with a disturbance of ship's movement (rolling, pitching) is adopted. In the fan beam type radar apparatus, a recognition of the target object is performed based on information on an amplitude of a non-modulated pulse signal.

Meanwhile, for example, JP2010-525336A discloses a radar apparatus installed on the ground that does not move (roll, pitch) like a ship and for highly accurately detecting a bird, which is equipped with a beam switching type antenna for repeating transmission and reception while switching an elevation angle at which a pencil beam is discharged for each pulse.

Generally, in a fan beam type radar apparatus, it has been difficult to discriminate a target object in a vertical direction. In addition, with the fan beam type, a signal intensity of a reception signal is obtained by integrating levels of the signal intensities in the vertical direction. Therefore, the influence of clutters that widely spread in a height direction, such as rain, is big and is a source of problem.

In order to discriminate a target object in the vertical direction (height) so as to solve the above problems, as disclosed in JP3,559,236 and JP2010-525336A, pulse signals corresponding to a resolution performance required for desired discrimination level in the vertical direction need to be repeatedly transceived. Thereby, the time for detecting a target object at each azimuth becomes longer as the number of the transceiving of the pulse signals increases, therefore, it is not suitable for a practical use, such as on a ship where monitoring in a wide range around an antenna is required.

SUMMARY OF THE INVENTION

The present invention is made in view of the situations as described above, and provides a radar apparatus for discharging a transmission beam while rotating an antenna, and a method of detecting a target object, that help discriminate a component within a reception signal of a target object from, such as, a clutter without requiring a long time for transceiving at each azimuth.

According to one aspect of the invention, a radar apparatus is provided, which includes an antenna for discharging a transmission beam with frequencies corresponding to elevation/depression angles with respect to a particular surface and receiving a reflection echo from a reflective body, and a reception module for detecting an elevation/depression angle of the reflective body based on a frequency component of a reception signal received by the antenna and detecting a distance of the reflective body based on a time component of the reception signal.

According to this radar apparatus, the reception module can detect the elevation/depression-angle of the reflective body based on the frequency component of the reception signal and detect the distance of the reflective body based on the time component of the reception signal.

The antenna may discharge the transmission beams at various azimuths while rotating around a rotational shaft perpendicular to the particular surface. The reception module may receive the reflection echoes at the various azimuths and may detect the distances and the elevation/depression angles at the respective azimuths.

The radar apparatus may further comprise a transmission module for generating a transmission signal that is frequency modulated. The antenna may have a plurality of antenna elements arranged along a direction perpendicular to the particular surface for discharging an electromagnetic wave in the antenna elements, and a plurality of phase shifters for shifting phases of the electromagnetic waves corresponding to the frequencies of the transmission signals to cause phase differences among the antenna elements.

The reception module may have a frequency component detecting module for detecting the frequency component of the reception signal and an amplitude component detecting module for detecting from the reception signal an amplitude component corresponding to the frequency component detected by the frequency component detecting module. The reception module may detect the elevation/depression angle and the distance of the reflective body based on a timing when the frequency component and the amplitude component are detected by the frequency component detecting module and the amplitude component detecting module, respectively.

The reception module may have a plurality of bandpass filters with center frequencies different from each other, for filtering the reception signal and an amplitude component detecting module for detecting amplitude components from a plurality of outputs of the plurality of bandpass filters. The reception module may detect the elevation/depression angle and the distance of the reflective body based on identification of the bandpass filter from which the amplitude component is outputted among the plurality of bandpass filters and based on a timing when the amplitude component is detected.

The antenna may discharge the transmission beams at various azimuths while rotating around a rotational shaft perpendicular to the particular surface. The reception module may have an inclination angle estimating module for extracting azimuth, distance, and elevation/depression angle information at a plurality of locations of a reference surface from the azimuth, the distance and the elevation/depression angle information of the reflective bodies detected by the reception module, and for estimating an inclination angle of the particular surface with respect to the reference surface.

The antenna may discharge the transmission beams at various azimuths while rotating around a rotational shaft perpendicular to the particular surface. The reception module may have a target object estimating module for estimating a reference surface based on azimuth, distance and elevation/depression angle information of the reflective bodies detected by the reception module, and for determining that the reception signal is from a target object if the reception signal indicates that the reflective body is located above the reference surface.

According to another aspect of the invention, a method of detecting a target object is provided, which includes discharging a transmission beam with frequencies corresponding to elevation/depression angles with respect to a particular surface, and receiving a reflection echo from a reflective body with an antenna, an elevation/depression angle of the reflective body being detected based on a frequency component of a reception signal received by the antenna, and a distance of the reflective body being detected based on a time component of the reception signal.

According to this method of detecting the target object, the elevation/depression angle of the reflective body can be detected based on the frequency component of the reception signal and the distance of the reflective body can be detected based on the time component of the reception signal.

The step of receiving the reflection echo may comprise selecting one or some of the reception signals within a particular elevation/depression angle range to detect a target object.

The step of discharging the transmission beam may comprise discharging the transmission beams at various azimuths while rotating the antenna around a rotational shaft perpendicular to the particular surface. The step of receiving the reflection echo may comprise extracting azimuth, distance, and elevation/depression angle information at a plurality of locations of a reference surface from the reception signal and estimating an inclination angle of the particular surface with respect to the reference surface in order to correct the elevation/depression angle of the reflective body based on the inclination angle.

The step of discharging the transmission beam may comprise discharging the transmission beams at various azimuths while rotating the antenna about a rotational axis perpendicular to the particular surface. The step of receiving the reflection echo may comprise extracting azimuth, distance and elevation/depression angle information of the reflective bodies from the reception signal, estimating a reference surface, and determining that the reception signal is from a target object if the reception signal indicates that the reflective body is located above the reference surface.

According to the aspects of the present invention, the azimuth, the distance and the elevation/depression angle of the reflective body is detected, and therefore, discrimination of a target object signal component from, for example, a clutter becomes easy. A time length required for transceiving signals at various azimuths is prevented from being long by scanning in the elevation/depression angle direction with the transmission beam and not by increasing the number of pulses in the transceiving due to the detection of the elevation/depression angle as above.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENTS

Hereinafter, several embodiments of the present invention are described with reference to the appended drawings.

First Embodiment

Figure 1:
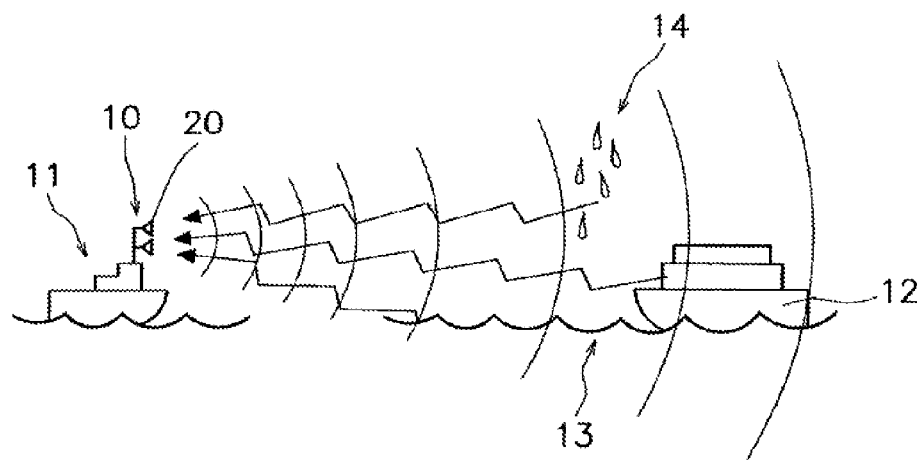
FIG. 1 is a conceptual diagram showing an example of using a radar apparatus according to a first embodiment of the present invention.

Hereinafter, a radar apparatus according to a first embodiment of the present invention is described with reference to FIGS. 1 to 17. A ship radar apparatus 10 is provided as an example of using the radar apparatus of the first embodiment. FIG. 1 is a conceptual view explaining a usage example of the ship radar apparatus 10. A ship 11 (hereinafter, referred to as "the ship 11") in FIG. 1 is mounted with the ship radar apparatus 10. In the ship 11, the ship radar apparatus 10 distinguishes a reflection echo of other ships 12 (target object) among reflection echoes of a sea surface 13, rain 14 and/or fog, for example, to detect the other ships 12.

Then the detected ship 12 is normally displayed on a display device (not illustrated) including a liquid crystal display. In a radar image to be displayed, a surrounding range of, for example, 360° centered on a position of the radar apparatus (antenna) is displayed, and the origin of the displayed image corresponds to the position of the radar apparatus. Therefore, based on a displayed position of the reflection echo of the target object in the radar image, an azimuth and a distance of the target object with reference to the ship 11 can be confirmed.

Transceivings of signals are performed while changing a turning angle of the antenna 20 to sequentially change an azimuth of the antenna 20. A detection performed by rotating the antenna 20 360° while performing a single transceiving at one azimuth is treated as one scan. In the one scan, for example, a transmission of a single-pulse transmission signal and a reception of the single-pulse reception signal are performed for each azimuth. The single transmission and reception of one pulse is treated as one sweep.

Figure 2:
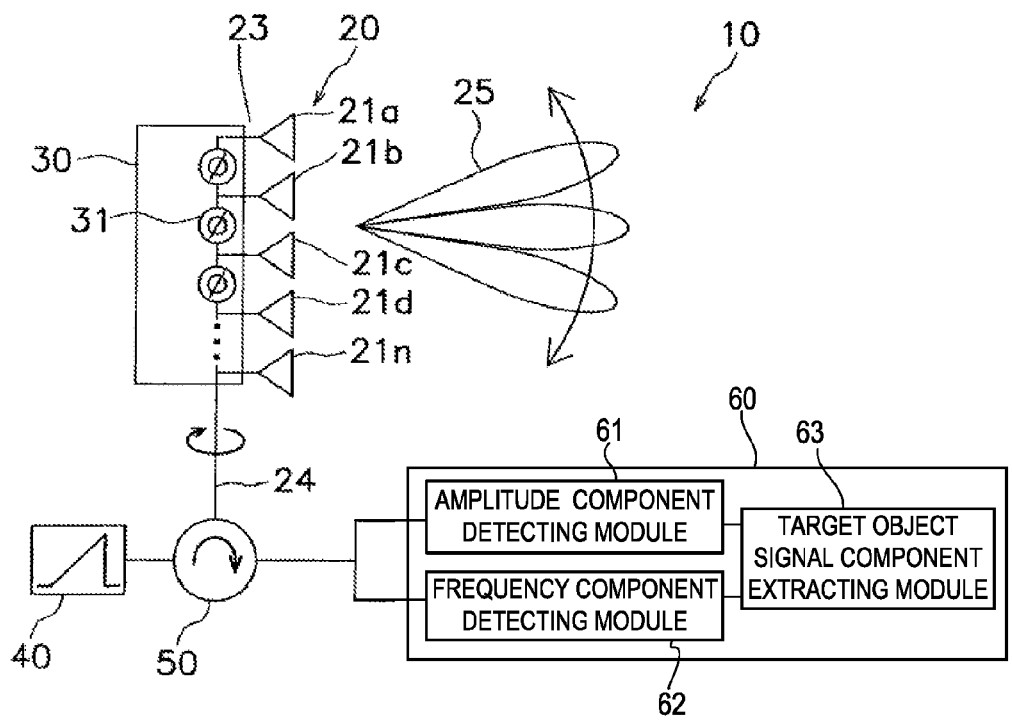
FIG. 2 is a schematic diagram showing a configuration of the radar apparatus according to the first embodiment.

As shown in FIG. 2, the ship radar apparatus 10 includes, other than the antenna 20 shown in FIG. 1, an elevation/depression angle direction scanning module 30 constituted with, for example, phase shifters 31; a transmission module 40; a transmission/reception duplexer 50 such as a circulator; and a reception module 60.

In the ship radar apparatus 10, first, a single-pulse transmission signal generated by the transmission module 40 is inputted to the transmission/reception duplexer 50 so that a transmission beam is transmitted from the antenna 20. The transmission signal is kept from entering into the reception module 60 by the transmission/reception duplexer 50 and transmitted to the antenna 20 via the elevation/depression angle direction scanning module 30. A single-pulse transmission beam 25 corresponding to the single-pulse transmission signal is discharged from the antenna 20. The transmission beam 25 is a pencil beam, and for example, at the initial stage of the pulse, the main beam is discharged and directed toward the most downward direction (depression angle) and the discharged direction of the main beam moves upward as the transmission signal progresses, and the discharged direction is oriented toward the most upward direction (elevation angle) in the final stage of the pulse.

A reception signal component of the reflection echo received by the antenna 20 passes through the elevation/depression angle direction scanning module 30 and is kept from entering into the transmission module 40 by the transmission/reception duplexer 50, and is further transmitted to the reception module 60. By passing through the elevation/depression angle direction scanning module 30, a reception beam scans in the elevation/depression angle direction. When the elevation/depression direction of the reception beam matches with the angle of the transmission beam 25, the corresponding reception signal component is transmitted to the reception module 60. For example, for the transmission beam 25 that is discharged toward a direction with the depression angle of 5°, the reception signal corresponding to the reception beam with the depression angle of 5° is selectively transmitted to the reception module 60.

Figure 3:
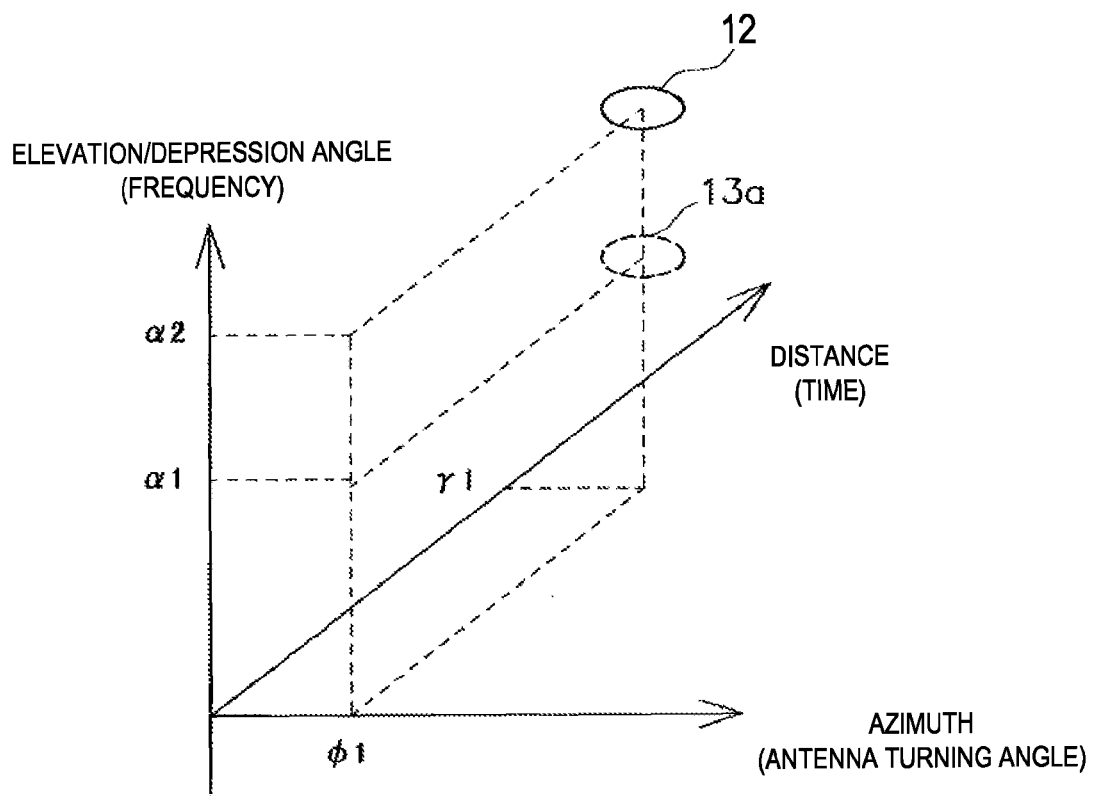
FIG. 3 is a chart explaining a coordinate of reflective bodies received by a reception module of the radar apparatus.

In the reception module 60, a detection of an azimuth, a distance and an angle in the elevation/depression angle direction from which a signal component of the reflection echo of the reflective body is obtained is performed and, based on the detection result, a clutter is suppressed and an image signal for displaying the target object is outputted. FIG. 3 is a chart showing an example of a coordinate of reflective bodies received by the reception module 60. The sea surface surrounds the entire azimuth, and only a sea surface area 13a around the ship 12 is illustrated in the chart of FIG. 3. Therefore, in FIG. 3, azimuth $\phi 1$ and distance $\gamma 1$ of the ship 12 and of the sea surface area 13a around the ship 12 match with each other. However, a difference occurs between the ship 12 and the sea surface area 13a in the elevation/depression angle direction. That is, an elevation/depression angle of the sea surface area 13a is $\alpha 1$ and, meanwhile, an elevation/depression angle of the ship 12 is $\alpha 2$. Therefore, because the elevation/depression angles of the sea surface 13a and the ship 12 are different from each other, the reception signal component of the sea surface 13a and the reception signal component of the ship 12 can be detected separately.

Hereinafter, configurations and operations of the respective modules shown in FIG. 2 are described in detail.
(Configuration of Antenna 20)

Figure 4:
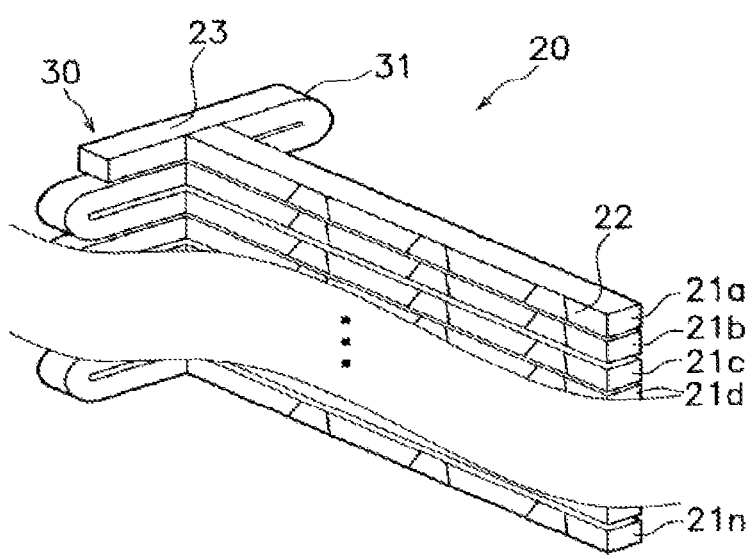
FIG. 4 is a perspective view showing a part of an example of an antenna of the radar apparatus.

FIG. 4 shows an example of the configurations of the antenna 20 and the elevation/depression angle direction scanning module 30 of the radar apparatus 10. The antenna 20 is constituted with a plurality of antenna elements 21a, 21b, 21c, 21d, . . . , and, 21n. The plurality of antenna elements 21a, 21b, 21c, 21d, . . . , and, 21n are attached to a rotational shaft 24 (see FIG. 2) extending in a height direction and stacked in the height direction. These antenna elements 21a, 21b, 21c, 21d, . . . , and, 21n rotate around the rotational shaft 24. In each of the antenna elements 21a, 21b, 21c, 21d, . . . , and, 21n, a plurality of slits 22 are formed in a direction perpendicular to the height direction. By the antenna elements 21a, 21b, 21c, 21d, . . . , and, 21n and the plurality of slits 22, the antenna 20 can form the beam into a pencil shape. Note that, although a slit array antenna is illustrated in FIG. 4 as the example of the antenna 20, other kinds of array antennas may be applied. The number of the antenna elements 21a, 21b, 21c, 21d, . . . , and, 21n is, for example, 20 to 60.

Transmission and reception signals are transmitted to and from each of the antenna elements 21a, 21b, 21c, 21d, . . . , and, 21n by feeding lines 23. Each of the phase shifters 31 is connected with the feeding line 23.
(Configuration of Elevation/Depression Angle Direction Scanning Module 30)

As shown in FIGS. 2 and 4, each of the phase shifters 31 is connected in between adjacent two of the antenna elements 21a, 21b, 21c, 21d, . . . , and, 21n. If the number of the antenna elements 21a, 21b, 21c, 21d, . . . , and, 21n is "m", because the transceiving of the transmission signal and the reception signal is directly performed between the antenna element 21n and the transmission/reception duplexer 50, the number of the phase shifters 31 provided to the elevation/depression angle direction scanning module 30 is "m-1".

Each of the phase shifters 31 delays the transmission signal by a predetermined time period so as to cause a phase difference of $\Delta\phi$ to the transmission signal to be supplied to the adjacently connected antenna elements 21a, 21b, 21c, 21d, . . . , and, 21n, comparable to such as a delay line. For example, a phase of the transmission signal for the antenna element 21a is delayed compared to the antenna element 21n by (m-1)×$\Delta\phi$, and a phase of the transmission signal for the antenna element 21b is delayed compared to the antenna element 21n by (m-2)×$\Delta\phi$.

By the phase difference $\Delta\phi$, the elevation/depression angle direction scanning module 30 can scan in the elevation/depression angle direction, with the transmission beam 25 for the single-pulse transmission signal discharged from the antenna 20. When an angle between a direction to which the main beam of the transmission beam 25 is directed and a horizontal direction (elevation/depression angle) is "θ", each distance between the adjacent antenna elements 21a, 21b, 21c, 21d, . . . , and, 21n is "d", a space wavelength of the transmission beam 25 is "λ", an in-tube wavelength is "λg", and a feed line length (length of the delay line) is "L", the elevation/depression angle "θ" satisfies the following equation.

$$\sin\theta = -\lambda/d \times (n \pm L/\lambda g) \quad (1)$$

Here, "n" is a nonnegative integer. By changing the in-tube wavelength λg, each of the phase differences Δϕ among the adjacent antenna elements 21a, 21b, 21c, 21d, . . . , and, 21n is changed.

(Configuration of Transmission Module 40)

Figure 5:
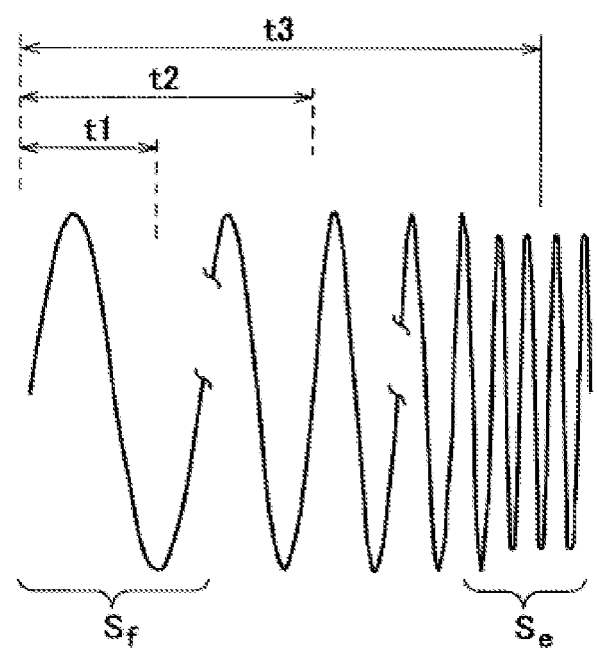
FIG. 5 is a waveform view showing an example of a waveform of a transmission signal that is outputted by a transmission module.

The transmission module 40 is configured to generate and output the single-pulse transmission signal at each time when the antenna 20 rotates a predetermined angle. FIG. 5 is a view showing an example of a waveform of the transmission signal that is outputted by the transmission module 40. The transmission signal shown in FIG. 5 is a so called chirp signal applied with linear frequency modulation. For example, a frequency of the single-pulse transmission signal is about 9.3 GHz at a point where only a timing t1 has elapsed from the start of the signal output, 9.4 GHz near the middle (at a timing t2) of the transmission signal, and 9.5 GHz in the end (at a timing t3) of the transmission signal. Note that, here, although the example in which the transmission signal is linearly frequency modulated is described, the frequency modulation is not limited to the case where the frequency changes linearly.

Figure 6A:
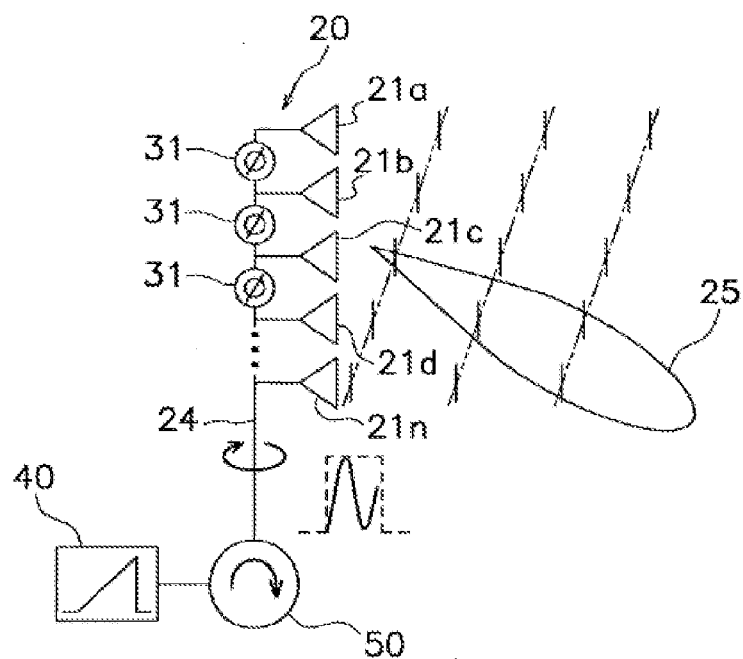
FIG. 6A is a conceptual view explaining a state where a main beam of a transmission beam is directed downward and FIG. 6B is a conceptual view explaining a state where the main beam of the transmission beam is directed upward.
Figure 6B:
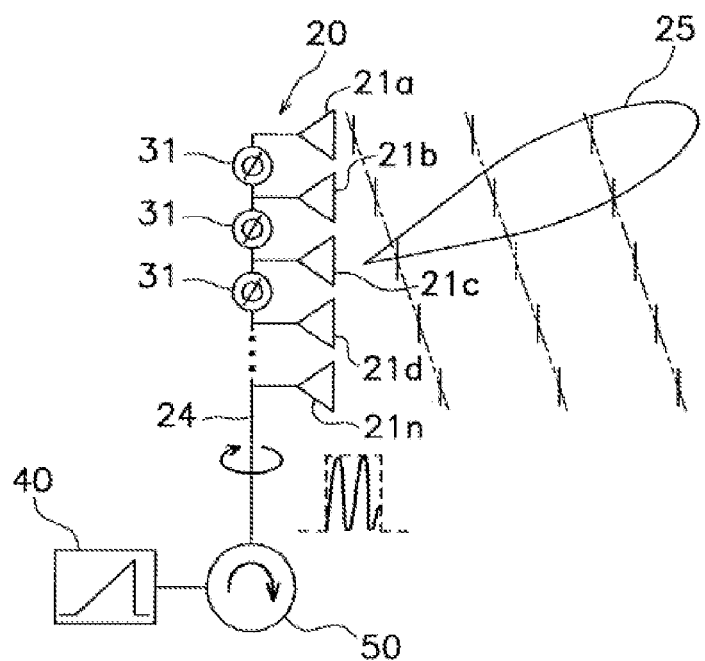

FIGS. 6A and 6B show states of scans in the elevation/depression angle direction when the transmission signal shown in FIG. 5 is supplied to the antenna 20 from the transmission module 40. FIG. 6A shows the state where a head portion Sf of the transmission signal (the initial stage of the pulse) is inputted to the antenna 20 and the main beam of the transmission beam 25 is directed downward. On the other hand, FIG. 6B shows the state where a rear portion Se of the transmission signal (the final stage of the pulse) is inputted to the antenna 20 and the main beam of the transmission beam 25 is directed upward.

Figure 7:
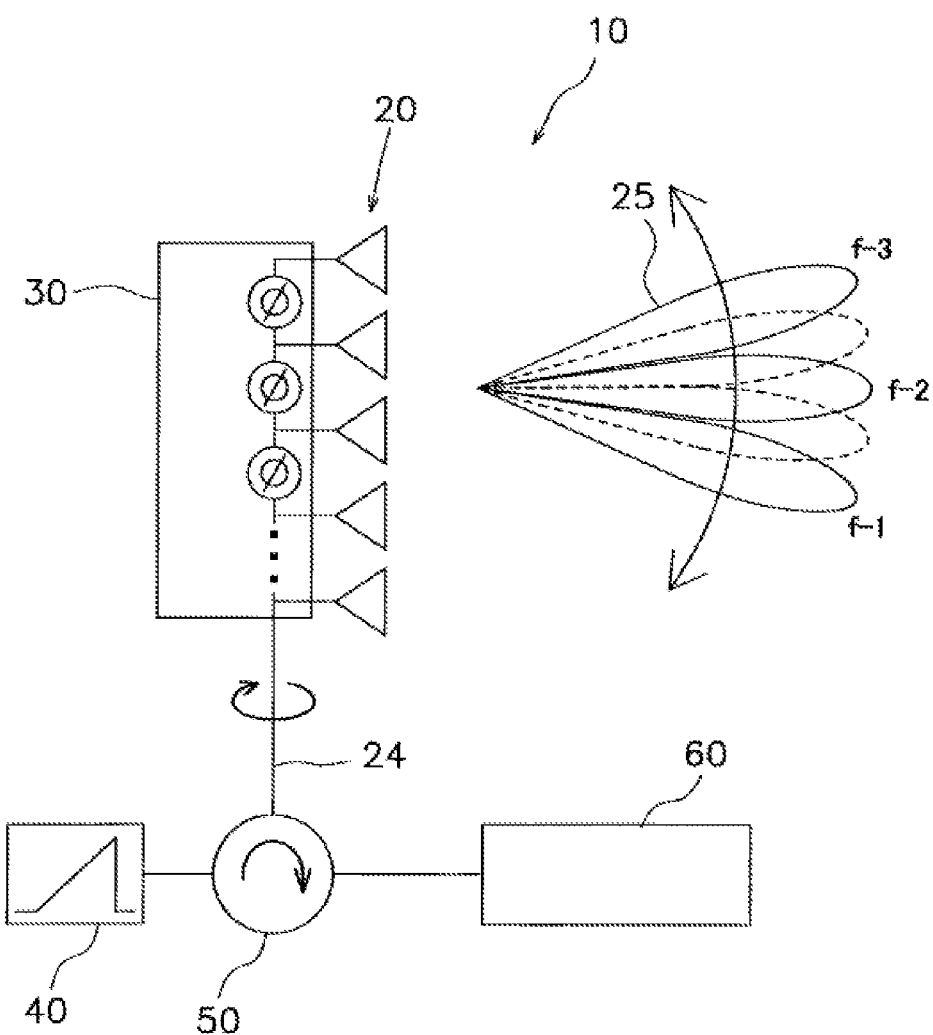
FIG. 7 is a conceptual view explaining a relation between an angle and a frequency of the main beam of the transmission beam in an elevation/depression angle direction.

That is, as shown in FIG. 7, by changing the frequency of the transmission signal from a low frequency f-1, through a middle frequency f-2, and to a high frequency f-3, the direction to which the main beam of the transmission beam 25 is directed can be changed from downward, through horizontal, and to upward. Note that, here, although the main beam of the transmission beam 25 is set to be directed downward when the frequency is low, conversely it may be set to be directed upward when the frequency is low.

Based on Equation (1), it may be derived that, for example, settings θ=0° when the frequency of the transmission signal is 9.4 GHz, θ=−10° when the frequency of the transmission signal is 9.3 GHz, and θ=10° when the frequency of the transmission signal is 9.5 GHz are possible.

Figure 8:
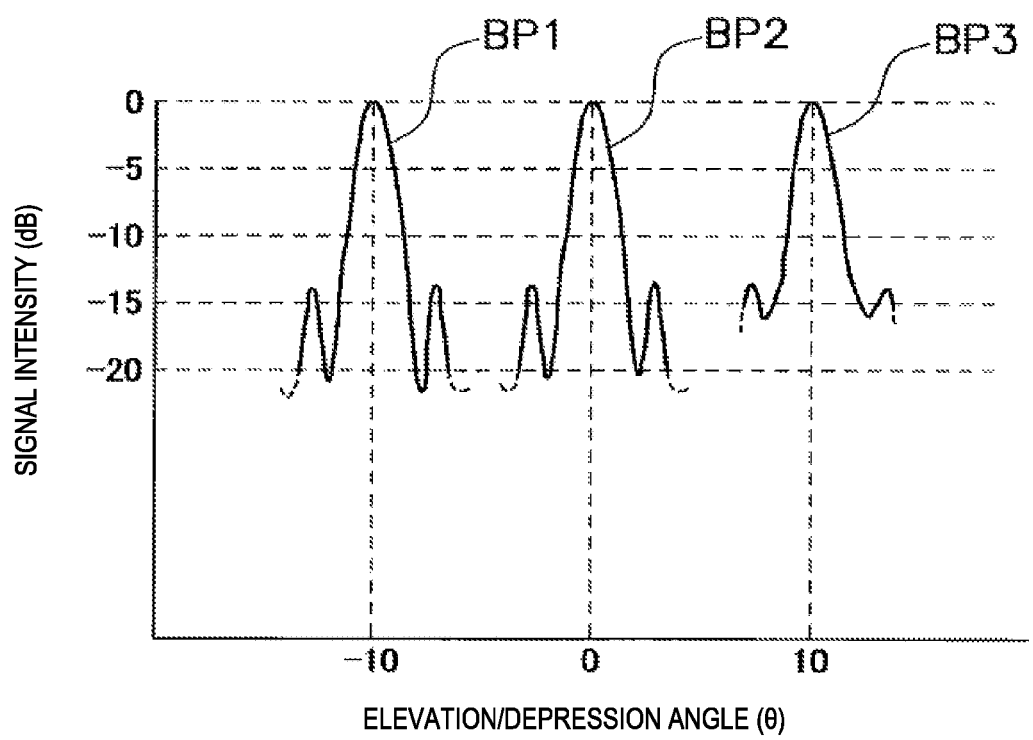
FIG. 8 is a conceptual chart showing beam patterns when scanning with a transmission signal where its frequency changes.

FIG. 8 is a conceptual chart showing beam patterns of the transmission beam 25 when scanning with the transmission signal where its frequency is changed from 9.3 GHz to 9.5 GHz by arranging a delay line of 415 mm among the forty antenna elements aligned in the height direction. The beam patterns shown in FIG. 8 are, starting from the left in the chart, a beam pattern BP1 of the transmission beam with the frequency of 9.3 GHz, a beam pattern BP2 of the transmission beam with the frequency of 9.4 GHz, a beam pattern BP3 of the transmission beam with the frequency of 9.5 GHz. Note that, the frequency band from 9.3 GHz to 9.5 GHz is a frequency band of an X-band pulse radar which is used for a ship. Further, as shown in FIG. 8, the scan can be performed within an elevation/depression angle range of −10° to 10° within the frequency band. Therefore the radar apparatus shown in FIG. 2 is fully practical to be used as a ship radar apparatus.

(Configuration of Reception Module 60)

As shown in FIG. 2, the reception module 60 includes an amplitude component detecting module 61, a frequency component detecting module 62, and a target object signal component extracting module 63.

The reception signal of the reflection echoes received by the antenna elements 21a, 21b, 21c, 21d, . . . , and, 21n, respectively, is transmitted to the reception module 60 via the elevation/depression angle direction scanning module 30. Therefore, in the reception signal transmitted to the reception module 60, the signal component(s) of the reflection echo(es) reflected from a direction identical to the direction to which the main beam of the transmission beam 25 is directed is/are strengthened and the signal component(s) of the reflection echo(es) reflected from the other directions is/are weakened. That is, the reception beam is also scanned from down to up corresponding to the frequency. Therefore, as the frequency component of the reception signal transmitted to the reception module 60 is lower, the reception signal is received at a larger depression angle, and as the frequency component of the reception signal transmitted to the reception module 60 is higher, the reception signal is received at a larger elevation angle. Such reception signal inputted to the reception module 60 is transmitted to the amplitude component detecting module 61 and the frequency component detecting module 62.

Figure 9A:
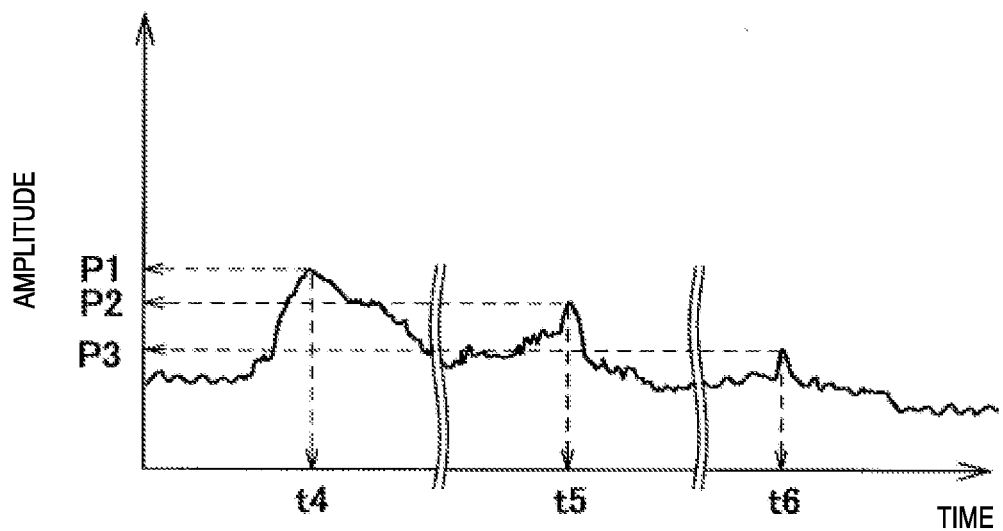
FIG. 9A is a chart explaining an amplitude detection performed by an amplitude component detecting module and FIG. 9B is a chart explaining a frequency detection performed by a frequency component detecting module.

Detections performed in the amplitude component detecting module 61 and the frequency component detecting module 62 are described with reference to FIGS. 9A and 9B. FIG. 9A is a chart explaining an amplitude detection performed by the amplitude component detecting module 61 and FIG. 9B is a chart explaining a frequency detection performed by the frequency component detecting module 62.

The amplitude detection in the amplitude component detecting module 61 and the frequency detection in the frequency component detecting module 62 are performed at the same timing. For example, at a timing t4, the amplitude component detecting module 61 detects an amplitude P1 of a reflection echo of the reception signal, and the frequency component detecting module 62 detects a frequency component f1 of a reflection echo of the reception signal at the timing t4 by using an analyzing method, such as the Fourier transform.

Figure 9B:
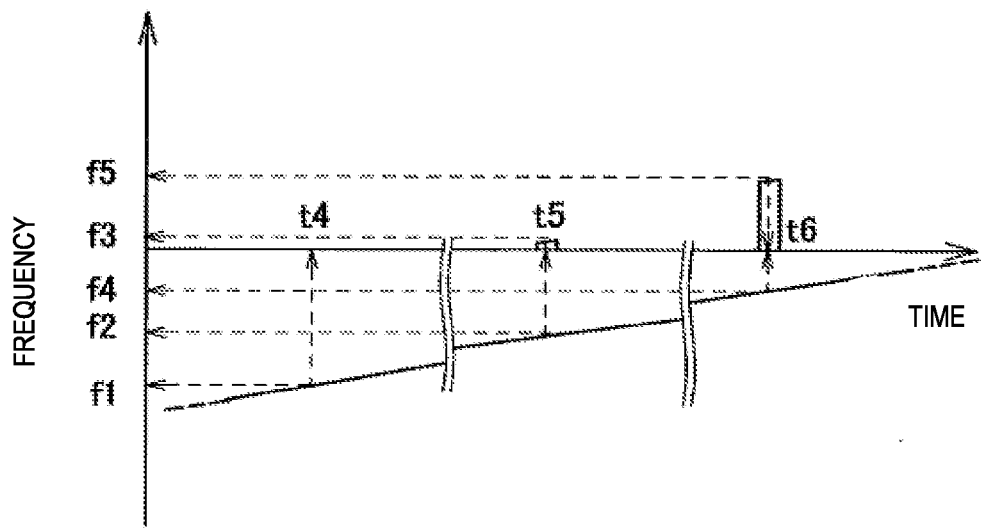

As shown in FIG. 9B, the reflection echo of the reception signal with the frequency component f1 detected at the timing t4 corresponds to the echo near the head portion Sf (at the timing t1) of the pulse of the transmission signal shown in FIG. 5. Thereby, it is understood that the main beam of the transmission beam 25 is directed downward (see FIG. 6A), and its elevation/depression angle is obtained. Moreover, based on the timing t4 (time component), a round trip distance traveled by the electromagnetic wave is obtained.

Next, the frequency component detecting module 62 detects a frequency component f2 of a reflection echo of the reception signal at a timing t5. As shown in FIG. 9B, the reflection echo of the reception signal with the frequency component f2 corresponds to the echo near the head portion Sf (at the timing t1) of the pulse of the transmission signal shown in FIG. 5. Thereby, it is understood that its main beam of the transmission beam 25 is directed downward (see FIG. 6A), and the elevation/depression angle is obtained. Further, a frequency component f3 of a reflection echo of the reception signal is detected by the frequency component detecting module 62 at the timing t5. As shown in FIG. 9B, the reflection echo of the reception signal with the frequency component f3 corresponds to the echo in the middle portion (at the timing t2) of the pulse of the transmission signal shown in FIG. 5. Thereby, it is understood that the main beam of the transmission beam 25 is directed approximately horizontally (the elevation/depression angle=0°). Moreover, based on the timing t5 (time component), a round trip distance traveled by the electromagnetic wave is obtained. For example, the ship 12 shown in FIG. 1 generates a reflection echo caused by the transmission beam 25 discharged approximately horizontally.

Next, the frequency component detecting module 62 detects a frequency component f4 of a reflection echo of the reception signal is detected at a timing t6. As shown in FIG. 9B, the reflection echo of the reception signal with the frequency component f4 corresponds to the echo near the head portion Sf (at the timing t1) of the pulse of the transmission signal shown in FIG. 5. Thereby, it is understood that the main beam of the transmission beam 25 is directed downward (see FIG. 6A), and its elevation/depression angle is obtained. Further, a frequency component f5 of a reflection echo of the reception signal is detected by the frequency component detecting module 62 at the timing t6. As shown in FIG. 9B, the reflection echo of the reception signal with the frequency component f5 corresponds the echo in the rear portion (at the timing t3) of the pulse of the transmission signal shown in FIG. 5. Thereby, it is understood that the main beam of the transmission beam 25 is directed upward (see FIG. 6B), and the elevation/depression angle is obtained. Moreover, based on the timing t6 (time component), a round trip distance traveled by the electromagnetic wave is obtained. For example, a pier of a bridge above the sea generates a reflection echo caused by a transmission beam discharged in an elevation angle direction.

In the above description, the information detected at the three timings t4, t5 and t6 is described, but actually a larger number of detections are repeatedly performed at a predetermined time interval. The information that is obtained at the timings t4 to t6 is obtained from a single pulse signal transmitted and received while the antenna 20 is directed toward one azimuth. As each pulse transmission signal corresponds to one azimuth, by identifying the pulse number from the first pulse (azimuth=0°), an azimuth is determined. Therefore, by performing the above described detections for the entire azimuth of the antenna 20, and by setting the antenna 20 at the origin of azimuth, distance and elevation/depression angle coordinate axes, all the necessary signal intensities (amplitudes) can be obtained in such coordinate system.

The data of the amplitude and the frequency detected by the amplitude component detecting module 61 and the frequency component detecting module 62, respectively, are outputted to the target object signal component extracting module 63. The data to be outputted to the target object signal component extracting module 63 contains the information on the azimuth, the distance (time), the elevation/depression angle (frequency), and the signal intensity (amplitude). For example, if the azimuth of the reception signal shown in FIGS. 9A and 9B is φ, based on the detection result at the timing t4, the target object signal component extracting module 63 receives the data (φ, t4, f1 and P1) indicating the signal intensity corresponding to the detected coordinate.

Figure 10:
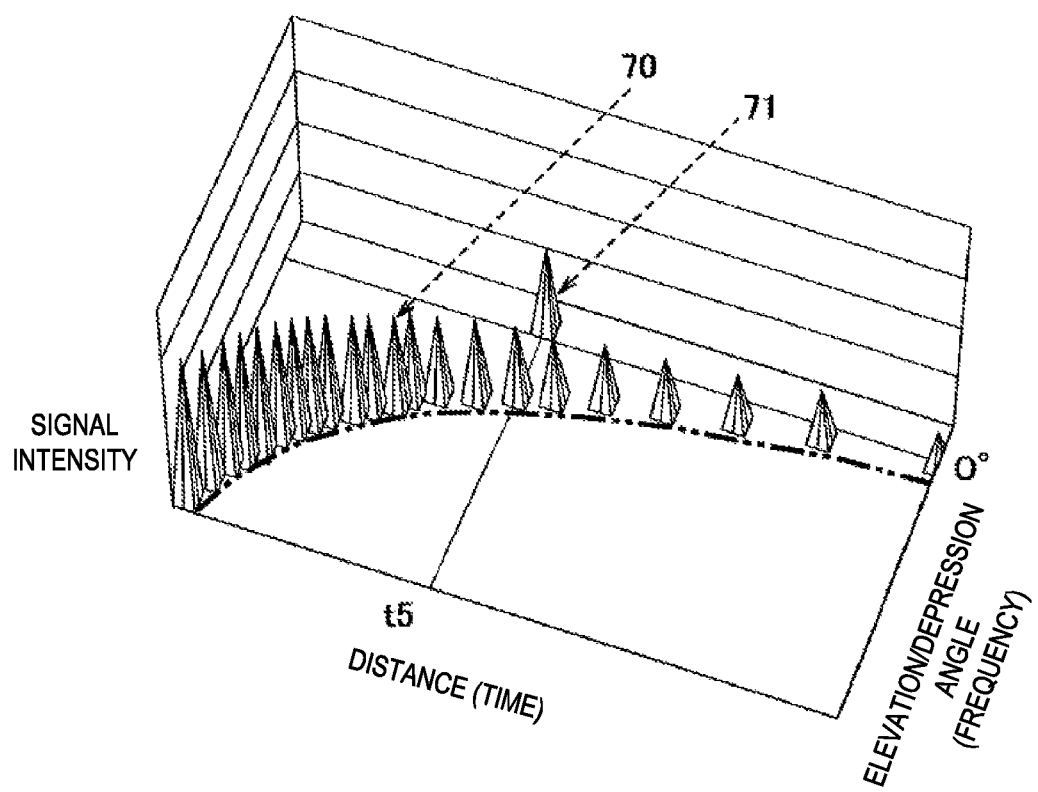
FIG. 10 is a chart explaining an example of a method of extracting mainly a target object signal component according to the first embodiment.

Then, the target object signal component extracting module 63 extracts a target object signal component from the received data. In the extraction, the target object signal component extracting module 63 separates the target object signal component from a component corresponding to a reflection echo from, for example, the sea surface by using the information on the elevation/depression angle so as to mainly extract the target object signal component as much as possible. FIG. 10 is a chart explaining an example of a method of extracting mainly the target object signal component. The information on a distance (time), an elevation/depression angle (frequency), and a signal intensity (amplitude) at the azimuth φ is organized in the chart of FIG. 10.

In FIG. 10, the data aligned along a two-dotted chain line is for a signal component 70 corresponding to the reflection echo from the sea surface. Since the chart of FIG. 10 includes the information on the elevation/depression angle and is illustrated three-dimensionally, the signal component 70 corresponding to the reflection echo from the sea surface and a target object signal component 71 can be distinguished from each other. As the example of the method of mainly extracting the target object signal component by distinguishing between the signal components 70 and 71, there is a method of only extracting the signal component corresponding to the reflection echo from the transmission beam 25 discharged horizontally. For example, for a ship floating on the sea surface, by performing the above described detection mainly for data relating to the transmission beam 25 discharged horizontally, an unused signal component such as the signal component 70 corresponding to the reflection echo from the sea surface is removed as much as possible and the target object signal component 71 can be detected. Thereby, the target object signal component 71 can easily be detected.

Modified Example 1-1

The radar apparatus 10 of the above embodiment is configured to detect the target object signal component 71 without considering movement (rolling, pitching) of the ship 11 mounted with the radar apparatus 10. However, when the detection performed for the signal component which is transmitted and received in a state where the ship 11 inclines, the antenna 20 is also inclined and the target object signal component may not be correctly detected from the reception signal. Therefore, a correction of inclination of the ship 11 is preferred to be performed by using, for example, an inclination detecting sensor for detecting an inclined angle of the ship 11. In a modified example described below, a reception module 60A is provided so that the inclined angle of the ship 11 is obtained from the data provided to the target object signal component extracting module 63.

Figure 12A:
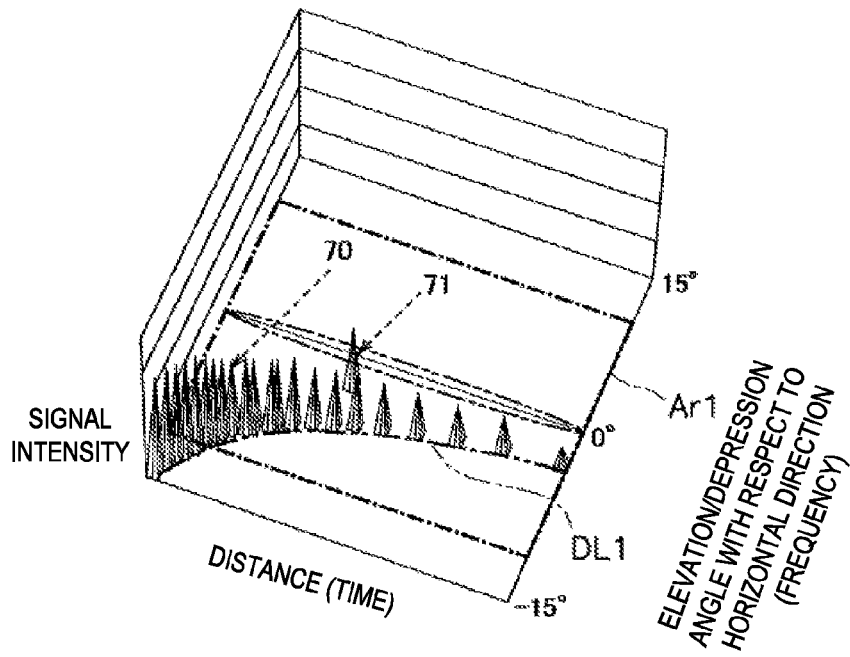
FIG. 12A is a chart explaining an area of a reception signal that is scanned in a state where the antenna is not inclined and FIG. 12B is a chart explaining an area of a reception signal that is scanned in a state where the antenna is inclined.
Figure 12B:
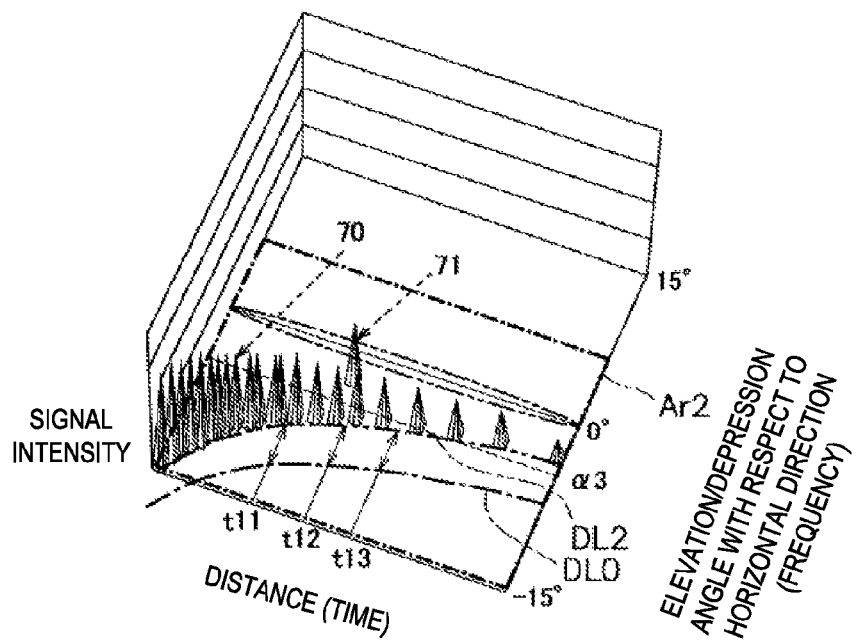

FIG. 12A shows an area Ar1 of the reception signal when scanning a range of ±10° in the elevation/depression angle with the transmission beam 25 in a state where the antenna 20 of the radar apparatus 10 is not inclined. FIG. 12B shows an area Ar2 of the reception signal when scanning a range of ±10° in the elevation/depression angle with the transmission beam 25 in a state where the ship 11 inclines −5° with respect to the horizontal direction (the antenna 20 is inclined −5° with respect to a vertical direction). When scanning the area Ar2 in FIG. 12B with the transmission beam 25, an elevation/depression angle of α3 from the center of the area Ar2 corresponds to the horizontal direction. Therefore, the target object signal component 71 cannot be fully captured unless the inclination of the antenna 20 is corrected.

Figure 11:
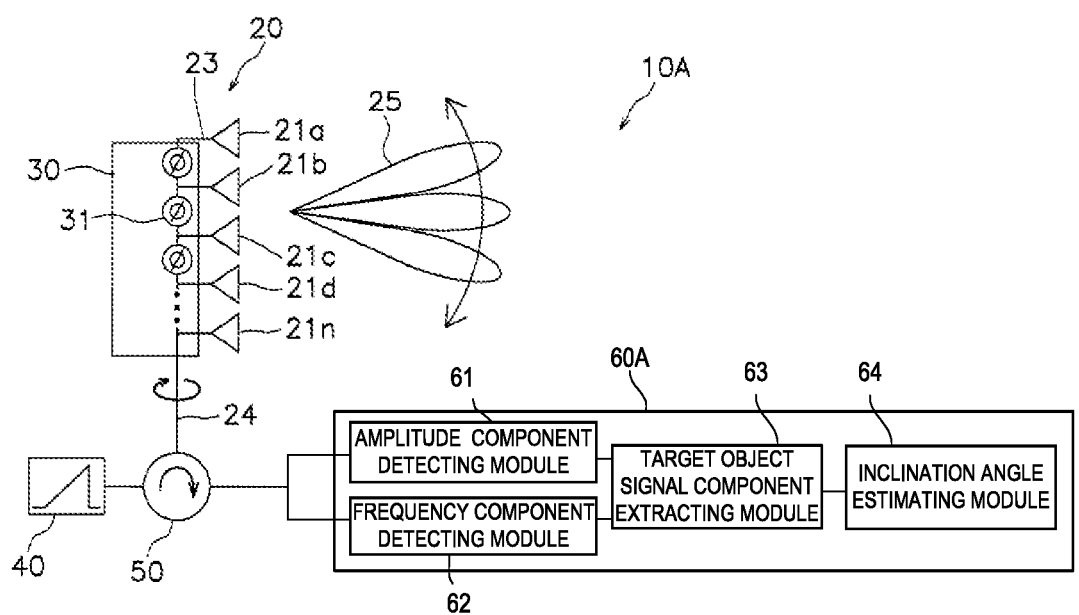
FIG. 11 is a conceptual diagram showing a modified example of the configuration of the radar apparatus according to the first embodiment.

Thus, as shown in FIG. 11, a radar apparatus 10A according to the modified example of the first embodiment is provided with an inclination angle estimating module 64, in addition to the configuration of the radar apparatus 10. The inclination angle estimating module 64 acquires the data from the target object signal component extracting module 63 and estimates the inclined angle of the antenna 20. The data relating to the inclination of the antenna 20 which is estimated by the inclination angle estimating module 64 is outputted to the target object signal component extracting module 63. The target object signal component extracting module 63 corrects the data acquired from the amplitude component detecting module 61 and the frequency component detecting module 62 with consideration to the inclination of the antenna 20. For example, when the antenna 20 is inclined −5° with respect to the horizontal direction and the data as shown in FIG. 12B is obtained, the target object signal component extracting module 63 performs a correction by setting an angle where 5° is added to the elevation/depression angle α3 as 0° in the elevation/depression angle.

The estimation which the inclination angle estimating module 64 performs by using the data acquired from the amplitude component detecting module 61 and the frequency component detecting module 62 is as follows. As it is seen from the two-dotted chain line DL1 in FIG. 12A extending along the signal component 70 of the sea surface, if the range of the value along the time axis is extended to infinity, the two-dotted chain line DL1 approaches the line at the elevation/depression angle of 0°. Therefore, the inclined angle of the antenna 20 can be calculated by using the two-dotted chain line DL2 in FIG. 12B indicating the signal component 70 of the sea surface.

For example, when a height of the antenna with respect to the sea surface is "h" and a distance from the sea surface where the reflection echo is caused to the ship 11 is "Ls", a depression angle θ is obtained by θ=arctan (h/Ls). Here, if assumed that the height "h" of the antenna does not change greatly, a theoretical equation for the one-dotted chain line DL0 as shown in FIG. 12B is established. By using the one-dotted chain line DL0, a difference in the elevation/depression angle between an actual measurement value and a value obtained from the theoretical equation can be obtained at a plurality of timings. For example, differences between the two-dotted chain line DL2 and the one-dotted chain line DL0 at respective timings t11, t12 and t13 in FIG. 12B are differences at a plurality of elevation/depression angles. The inclined angle of the antenna 20 can be obtained by suitably statistically processing the differences at the plurality of elevation/depression angles, for example setting the inclined angle of the antenna 20 as the median value of the differences at the plurality of elevation/depression angle.

Note that, such theoretical value can be obtained by other methods, such as, utilizing an average value of actual measurement values for the entire azimuth of the ship 11. This is because the ship 11 moves (rolls, pitches) without bias and, therefore, by averaging the actual measurement values for the entire azimuth, a value close to the theoretical value can be obtained.

Modified Example 1-2

Figure 13:
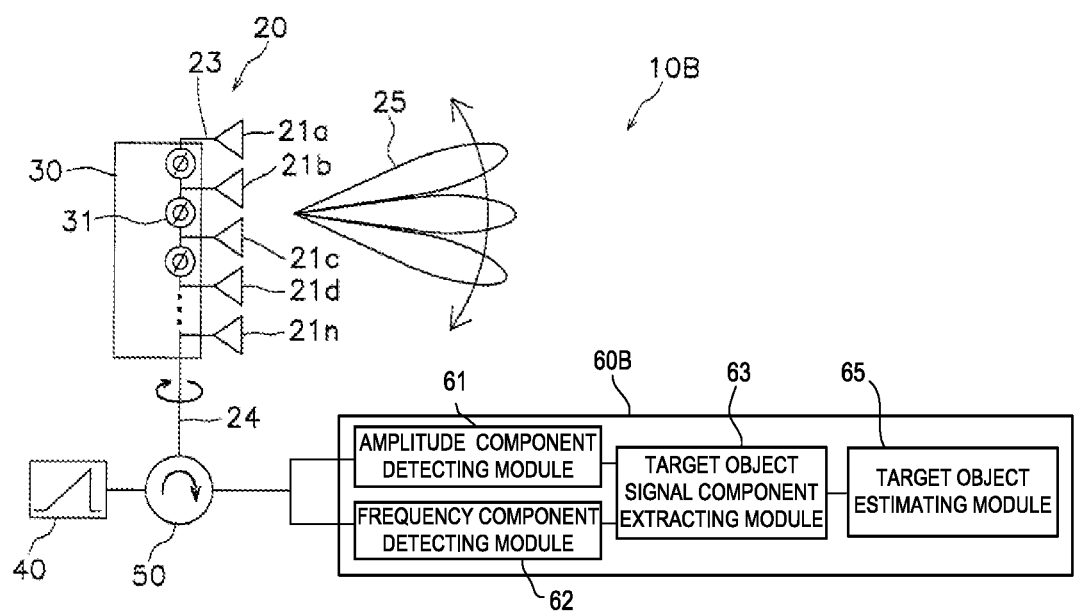
FIG. 13 is a conceptual diagram showing another modified example of the configuration of the radar apparatus according to the first embodiment.

As shown in FIG. 13, a radar apparatus 10B according to another modified example of the first embodiment is provided with a reception module 60B having a target object estimating module 65, in addition to the configuration of the radar apparatus 10. The target object estimating module 65 acquires the data from the target object signal component extracting module 63 and estimates whether the acquired data is from a target object. The estimation by the target object estimating module 65 is for estimating the two-dotted chain line DL1 shown in FIG. 12A, that is an envelope curve indicating the sea surface, and estimating whether the data is from the target object based on the envelope curve. The envelope curve can be obtained by, for example, similar to the method in the modified example 1-1, obtaining a difference between the theoretical value and the actual measurement value. The radar apparatus 10B is mounted on the ship 11 shown in FIG. 1 same as the radar apparatuses 10 and 10A, and uses an electromagnetic wave discharged in the air, in other words, a reflective body located below the sea surface is not a target object to be captured. Therefore, by determining only what is located above the envelope curve (what is located above the sea) as a target object, all the data indications of the reflective body located below the sea surface can be treated as noise.

Modified Example 1-3

In the above embodiment and examples, cases where, in the radar apparatuses 10 and 10A, the amplitude component detecting module 61, the frequency component detecting module 62, the target object signal component extracting module 63, the inclination angle estimating module 64 of the reception module 60 are constituted from hardware are described; however, the functions of the amplitude component detecting module 61, the frequency component detecting module 62, the target object signal component extracting module 63, the inclination angle estimating module 64 may be achieved by software. In this case, a control module such as a CPU read a program from a storage media, for example a ROM, achieves the functions of the amplitude component detecting module 61, the frequency component detecting module 62, the target object signal component extracting module 63, the inclination angle estimating module 64 of this embodiment.

Characteristics (1) In the antenna 20, the antenna elements 21a, 21b, 21c, 21d, . . . , and, 21n rotate around the rotational shaft 24. The rotational shaft 24 is installed perpendicularly to a horizontal structure body (particular surface) of the ship 11. That is, in a state where the ship 11 floats on a calm water surface, the rotational shaft 24 stands vertically with respect to the water surface or the particular surface. In this state, the single pulse transmission beam 25 is discharged from the antenna 20 at a predetermined azimuth angle interval. Detections of all reflective bodies (target object and sea surface) existing at a predetermined azimuth within a predetermined elevation/depression angle range and a predetermined distance are performed by the single pulse transmission beam 25. Note that, the antenna 20 may not rotate 360° and may turn within a predetermined angle range repeatedly. Further, in a case where the time it takes for detecting at each azimuth may be extended, the number of pulses of the transmission beam 25 which are discharged at each azimuth may be increased. Even in the case where the number of the pulses is increased (in a case where the discharge and reception of the transmission beam 25 at one azimuth is repeated a plurality of timing), a scan in the elevation/depression angle direction is performed for each of the pulses.

Each of the phases of the electromagnetic waves discharged from the antenna elements 21a, 21b, 21c, 21d, . . . , and, 21n is configured to shift from the adjacent antenna elements by a predetermined value by the phase shifter 31 of the elevation/depression angle direction scanning module 30. The transmission signal generated in the transmission module 40 is frequency modulated as shown in FIG. 5 so as to transmit the above transmission beam 25. Therefore, the scan in which the discharging direction changes in the elevation/depression angle direction can be performed, for example, the transmission beam 25 is discharged toward the depression angle direction in the initial portion Sf of the transmission signal shown in FIG. 5 and the transmission beam 25 is discharged toward the elevation angle direction in the final portion Se of the transmission signal. Note that, as long as the scan is performed with the single-pulse transmission beam 25, the direction and the method of the scan are not limited to scanning once from the depression angle side toward the elevation angle side.

Therefore, the frequency of the transmission beam 25 corresponds to the elevation/depression angle at which the main beam of the transmission beam 25 is directed. Thus, the direction of the elevation/depression angle with respect to the particular surface of the antenna 20, from which the reflection echo with the amplitude component detected by the amplitude component detecting module 61 of the reception module 60 is caused, can be identified by the frequency component detected by the frequency component detecting module 62 of the reception module 60. Further, the distance at which the reflection echo reflects can be identified from, similar to the conventional method, the time component of the reception signal, and also the azimuth can be identified from, similar to the conventional method, the turning angle of the antenna.

Figure 14:
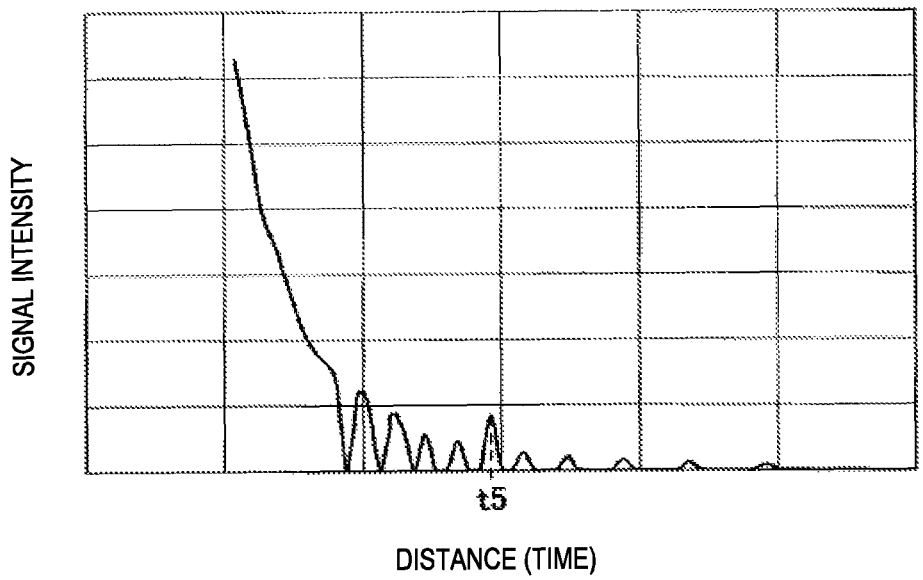
FIG. 14 is a chart explaining a conventional reception signal of which reflection echoes are integrated in a depression direction.

Conventionally, the transmission beam which is discharged from the antenna 20 is a fan beam that spreads in a fan shape, therefore, as shown in FIG. 14, the reflection echoes have been received in a manner where they are integrated in the elevation/depression angle direction. Therefore, the signal component corresponding to the reflection echo from the ship at the timing t5 does not have a signal intensity that is high enough compared to the signal component corresponding to the reflection echo from the sea surface which is received before or after the timing t5.

Figure 15:
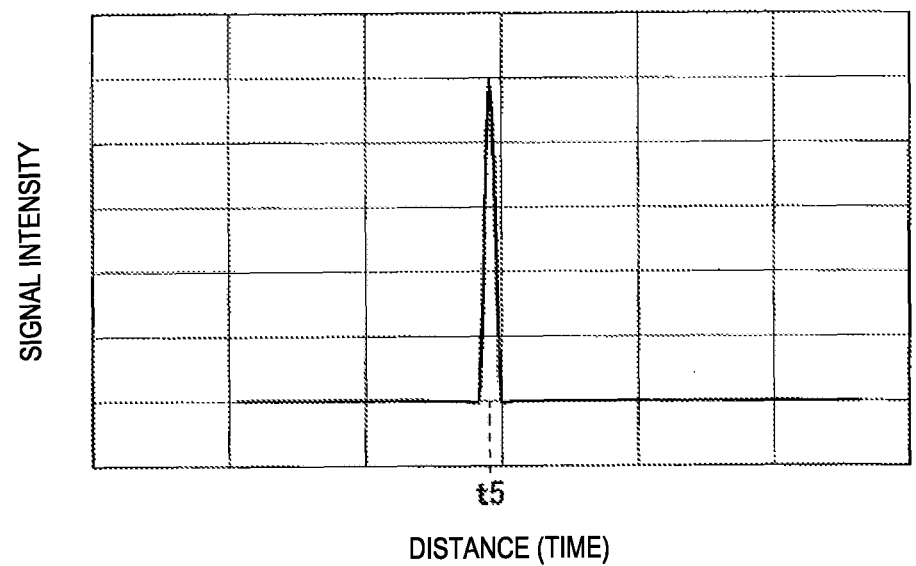
FIG. 15 is a chart explaining extraction of a signal intensity at an elevation/depression angle of 0° according to the first embodiment.

Meanwhile, if an elevation/depression angle range for the transmission and reception is limited, unnecessary signal component corresponding to the reflection echo from the sea surface can be removed. FIG. 15 is a chart in which the signal intensity of the signal component that is transmitted and received from the direction parallel to the particular surface, that is the signal intensity at the elevation/depression angle of 0° shown in FIG. 10, is extracted. As it can be seen by comparing FIGS. 14 and 15, by limiting the elevation/depression angle range for the detection to remove the signal component other than the target object signal component, the target object signal component is easier to be extracted.

As described above, the detection of the target object signal component can be performed by the transmission and reception of the single-pulse signal. Therefore, comparing to the case where a plurality of pulse signals are required to be transmitted and received, the detection of the target object can be performed in a shorter time length.

Figure 16:
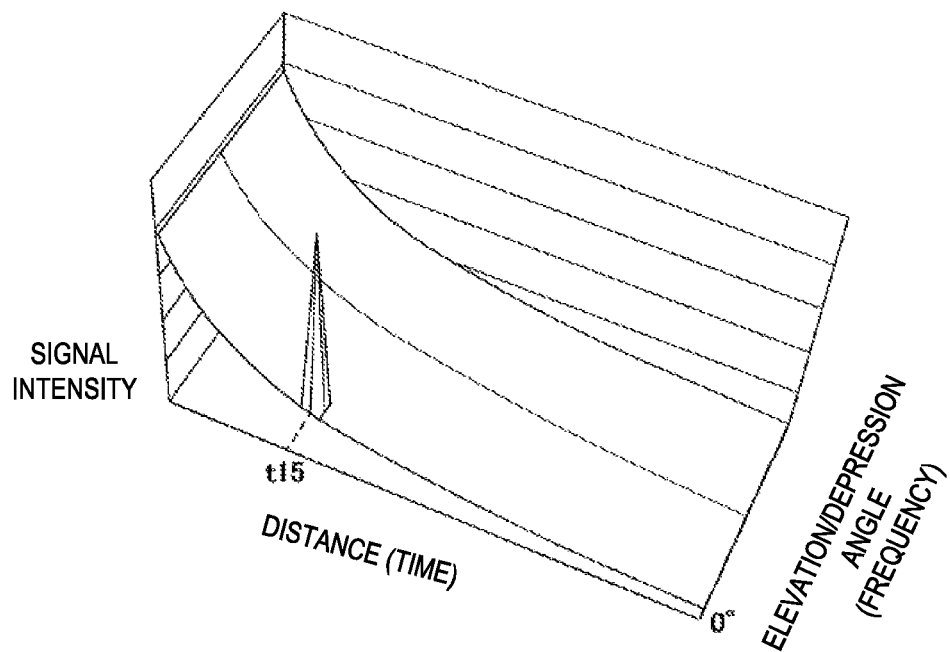
FIG. 16 is a chart explaining a conventional reception signal of which reflection echoes are integrated in an elevation direction.
Figure 17:
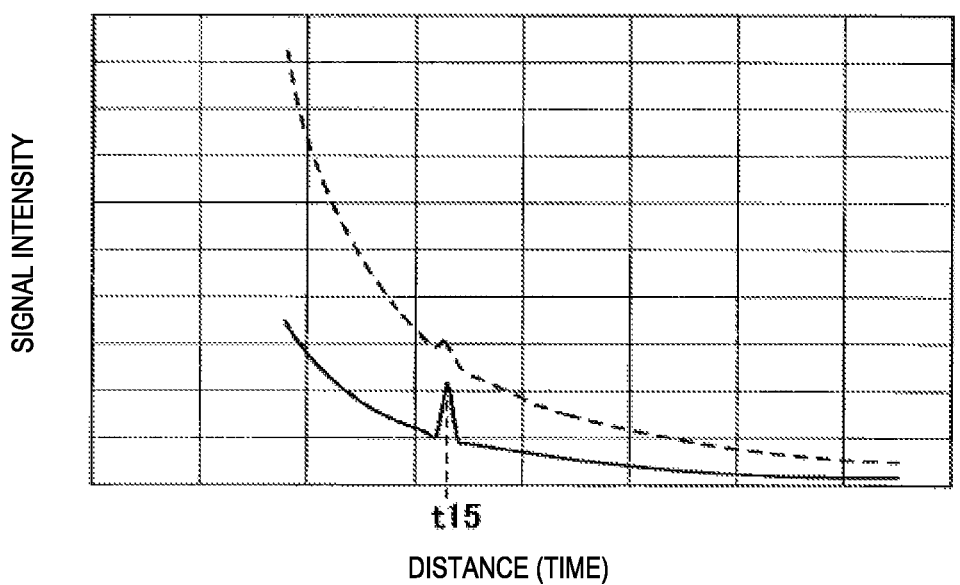
FIG. 17 is a chart explaining extraction of a signal intensity at an elevation/depression angle of 0° according to the first embodiment.

The case where the separation of the reception signal component of the target object becomes easy by detecting the elevation/depression angle in addition to the azimuth and distance of the reflective body is not limited to when the reflection echo from the sea surface exists. For example, FIG. 16 shows an example of data that is obtained by the reception module 60 when a clutter, for example rain, exists. Because the clutter such as rain widely spreads in the elevation/depression angle direction and the conventional radar apparatus using a fan beam has been able to obtain only the integrated levels of signal intensities in the elevation/depression angle direction, therefore, the target object signal component appearing at a timing t15 has been difficult to be extracted because it is buried in a clutter component as indicated by the dotted line in FIG. 17. Even in such case, by limiting the elevation/depression angle range to be analyzed to around 0° (a particular elevation/depression angle range), the signal intensity of the clutter component is suppressed and the extraction of the target object signal component becomes easy.

(2) As described above, in the moving (rolling, pitching) ship 11, the antenna 20 also moves (rolls, pitches) and the discharging direction of the transmission beam 25 greatly changes particularly in the elevation/depression angle direction, and therefore, the extraction of the target object signal component is difficult. Thus, as shown in FIG. 12B, the radar apparatus 10A is provided with the inclination angle estimating module 64 for estimating, by having the sea surface as a reference surface, the inclined angle of the antenna 20 with respect to the reference surface.

In the inclination angle estimating module 64, the data relating to the azimuth, distance, and elevation angle of the sea surface serving as the reference surface is acquired from the target object signal component extracting module 63 and the difference in the elevation/depression angle between the theoretical value in FIG. 12B (the one-dotted chain line DL0) and the actual measurement value (the two-dotted chain line DL2) is obtained. Thereby, as the inclination of the antenna 20 is corrected, a sensor for measuring the inclination of the antenna 20 can be economized.

(3) In the target object estimating module 65, by using the estimated sea surface (reference surface), the data can be determined whether coming from a reflective body located below the sea surface or above the sea surface. Therefore, data coming from a reflective body located below the sea surface can be removed as noise and SN (signal to noise) ratio can be improved.

Second Embodiment

Figure 18:
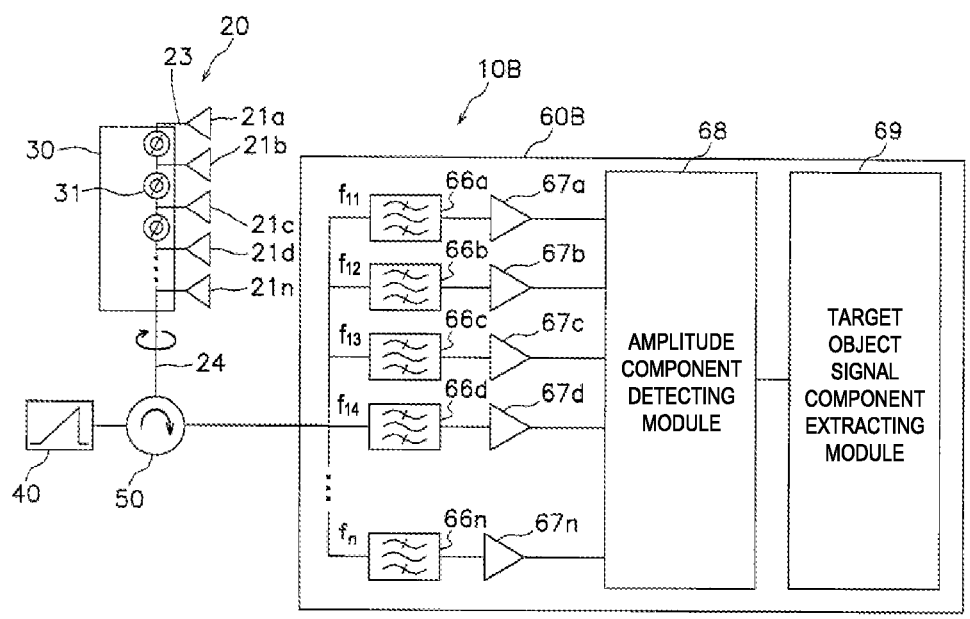
FIG. 18 is a schematic diagram showing a configuration of a radar apparatus according to a second embodiment.
Figure 19A:
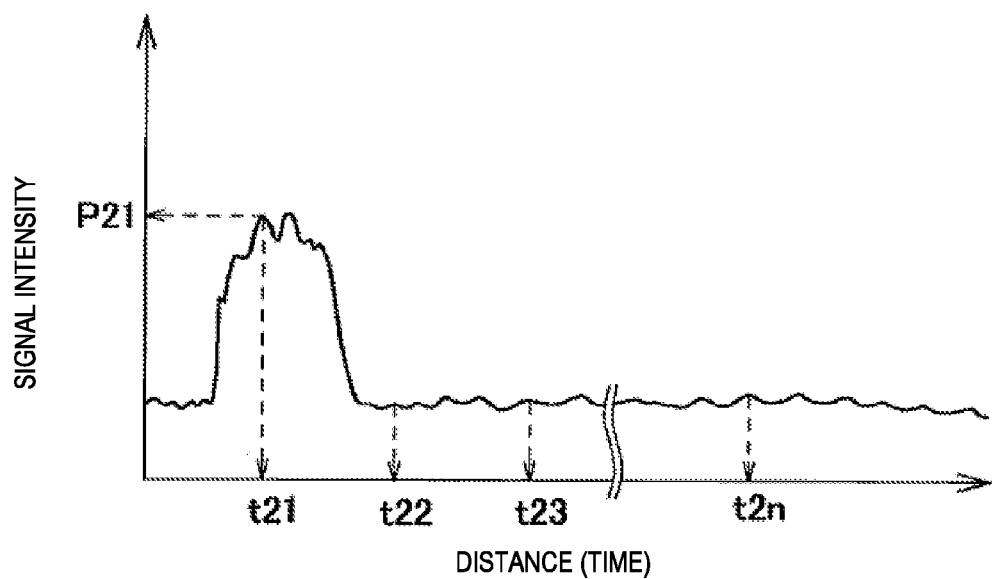
FIG. 19A is a waveform chart showing outputs from one bandpass filter and FIG. 19B is a waveform chart showing outputs from another bandpass filter.
Figure 19B:
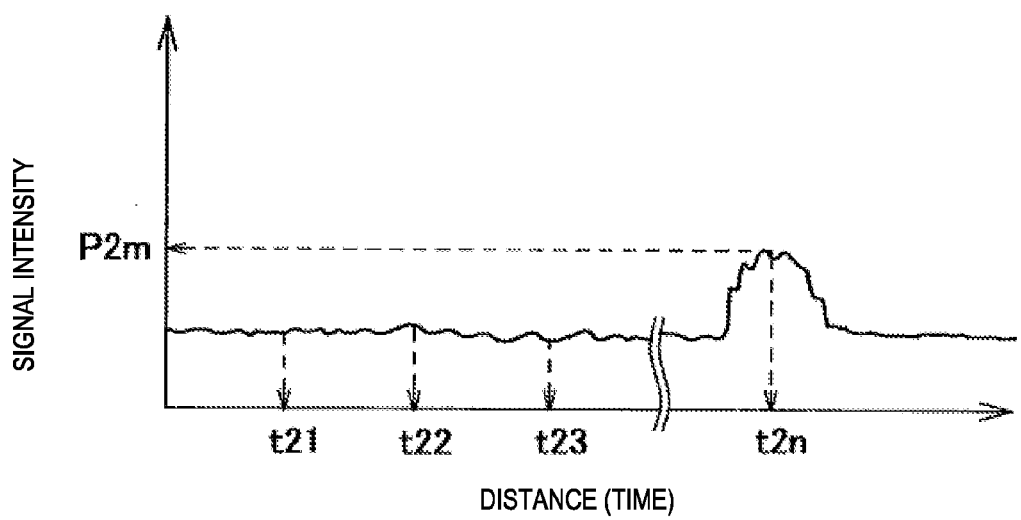

Hereinafter, a ship radar apparatus according to a second embodiment is described in detail with reference to FIGS. 18, 19A and 19B. As shown in FIG. 18, the difference between a ship radar apparatus 10B of the second embodiment and the ship radar apparatus 10 of the first embodiment is a configuration of a reception module 60B. The reception module 60B of the ship radar apparatus 10B of the second embodiment includes a plurality of bandpass filters 66a, 66b, 66c, 66d, . . . , and, 66n having center frequencies f11, f12, f13, f14, . . . , and, fn different from each other, amplifiers 67a, 67b, 67c, 67d, . . . , and, 67n for amplifying outputs from the bandpass filters, respectively, an amplitude component detecting module 68 for detecting amplitude components of outputs from the amplifiers 67a, 67b, 67c, 67d, . . . , and, 67n, and a target object signal component extracting module 69.

The outputs from the bandpass filters 66a, 66b, 66c, 66d, . . . , and, 66n correspond to elevation/depression angles corresponding to the center frequencies f11, f12, f13, f14, . . . , and, fn. For example, what passes through the bandpass filter 66a with the center frequency f11 can be limited to the initial portion Sf of the pulse shown in FIG. 5. That is, the output from the bandpass filter 66a corresponds to the transmission beam 25 discharged in the depression angle direction as shown in FIG. 6A. An output having a comparatively strong signal intensity P21 is outputted from the bandpass filter 66a at a timing t21 shown in FIG. 19A. Because such a reflective body generating the strong signal intensity P21 at the timing t21 generates a reflection echo discharged from a comparatively close distance at a large depression-angle, the sea surface 13 shown in FIG. 1 can be considered as the reflective body.

For example, what passes through the bandpass filter 66d with the center frequency f14 can be limited to the mid portion (around the timing t2) of the pulse shown in FIG. 5. That is, the output of the bandpass filter 66d corresponds to the transmission beam 25 discharged in the elevation/depression angle of 0°. An output having a comparatively strong signal intensity P2m is outputted from the bandpass filter 66d at a timing t2n shown in FIG. 19B. Because such a reflective body generating the strong signal intensity P2m at the timing t2n generates a reflection echo discharged from the horizontal direction, for example, the ship 11 shown in FIG. 1 can be considered as the reflective body.

The amplitude component detecting module 68 detects the amplitude components of the outputs from the bandpass filters 66a, 66b, 66c, 66d, . . . , and, 66n. Data for a predetermined number of sampling is obtained for the outputs from the bandpass filters 66a, 66b, 66c, 66d, . . . , and, 66n each corresponding to a single-pulse transmission signal. Each pulse transmission signal corresponds to each azimuth, therefore by identifying which pulse number it is starting from a first pulse (azimuth=0°), an azimuth is determined. Further, by identifying the bandpass filter 66a . . . 66n from which the data is outputted, an elevation/depression angle is determined. Moreover, a distance is determined from a time component where the amplitude is detected. The amplitude component detecting module 68 creates data for the outputs from all of the bandpass filters 66a, 66b, 66c, 66d, . . . , and, 66n by identifying the azimuth, the elevation/depression angle, and the distance of the sampled amplitude.

As described above, the data inputted to the target object signal component extracting module 69 shown in FIG. 18 is same as the data inputted to the target object signal component extracting module 63 shown in FIG. 2 in the end. Similar processing as the target object signal component extracting module 63 is performed also in the target object signal component extracting module 69.

Modified Example 2-1

The ship radar apparatus 10B of the second embodiment can be configured to have the similar configuration as the inclination angle estimating module 64 of the ship radar apparatus 10A of the first embodiment because the target object signal component extracting module 69 performs the similar processing as the target object signal component extracting module 63.

Modified Example 2-2

In the above embodiment and example, the case where, in the radar apparatuses 10B, the bandpass filters 66a, 66b, 66c, 66d, . . . , and, 66n, the amplifiers 67a, 67b, 67c, 67d, . . . , and, 67n, the amplitude component detecting module 68, and the target object signal component extracting module 69 are constituted from hardware is described; however, the functions of the bandpass filters 66a, 66b, 66c, 66d, . . . , and, 66n, the amplifiers 67a, 67b, 67c, 67d, . . . , and, 67n, the amplitude component detecting module 68, and the target object signal component extracting module 69 may be achieved by software. In this case, a control module such as a CPU read a program from a storage media, for example a ROM, achieves the functions of the bandpass filters 66a, 66b, 66c, 66d, . . . , and, 66n, the amplifiers 67a, 67b, 67c, 67d, . . . , and, 67n, the amplitude component detecting module 68, and the target object signal component extracting module 69.

Characteristics

The frequency of the transmission beam 25 corresponds to the elevation/depression angle to which the main beam of the transmission beam 25 is directed. Thus, the direction of the elevation/depression angle with respect to the particular surface of the antenna 20, from which the reflection echo with the amplitude component detected by the amplitude component detecting module 68 of the reception module 60B is caused, can be detected by identifying the bandpass filter which outputted the amplitude component among the bandpass filters 66a, 66b, 66c, 66d, . . . , and, 66n.

Similar to the ship radar apparatuses 10 and 10A of the first embodiment, by limiting an elevation/depression angle range for the transmission and reception, the unnecessary signal component corresponding to, for example, the reflection echo from the sea surface can be removed and the target object signal component is easier to extract. Further, also similar to the ship radar apparatuses 10 and 10A of the first embodiment as described above, the detection of the target object signal component can be performed by the transmission and reception of the single-pulse signal. Therefore, comparing to the case where a plurality of pulse signals are required to be transmitted and received, the detection of the target object can be performed in a shorter time length.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a," "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar apparatus, comprising:
an antenna configured to discharge a transmission beam with frequencies corresponding to elevation/depression angles with respect to a particular surface, the antenna discharging the transmission beam at various azimuths while rotating around a rotational shaft perpendicular to the particular surface, and further configured to receive a reflection echo from a reflective body;
a receiver configured to detect an elevation/depression angle of the reflective body based on a frequency component of a reception signal received by the antenna and detect a distance of the reflective body based on a time component of the reception signal;
a reference surface discriminator configured to discriminate a reference surface from among the reflective bodies based on azimuth, distance and elevation/depression angle information of the reflective bodies; and
a target object discriminator configured to discriminate a target object from among the reflective bodies by extracting, based on azimuth, distance and elevation/depression angle information of the reflective bodies, reflective bodies that are located above the reference surface.

2. The radar apparatus of claim 1, wherein the antenna discharges the transmission beams at various azimuths while rotating around a rotational shaft perpendicular to the particular surface; and
wherein the receiver receives the reflection echoes at the various azimuths and detects the distances and the elevation/depression angles at the respective azimuths.

3. The radar apparatus of claim 1, further comprising a transmitter configured to generate a transmission signal that is frequency modulated, wherein the antenna comprises:
a plurality of antenna elements arranged along a direction perpendicular to the particular surface for discharging an electromagnetic wave in the antenna elements; and
a plurality of phase shifters for shifting phases of the electromagnetic waves corresponding to the frequencies of the transmission signals to cause phase differences among the antenna elements.

4. The radar apparatus of claim 1, wherein the receiver comprises a processor configured to perform the following functions:
detecting the frequency component of the reception signal; and
detecting from the reception signal an amplitude component corresponding to the frequency component;
wherein the receiver detects the elevation/depression angle and the distance of the reflective body based on a timing when the frequency component and the amplitude component are detected.

5. The radar apparatus of claim 1, wherein the receiver comprises:
a plurality of bandpass filters with center frequencies different from each other, for filtering the reception signal; and
a processor configured to detect amplitude components from a plurality of outputs of the plurality of bandpass filters;
wherein the receiver detects the elevation/depression angle and the distance of the reflective body based on identification of the bandpass filter from which the amplitude component is outputted among the plurality of bandpass filters and based on a timing when the amplitude component is detected.

6. The radar apparatus of claim 1,
further comprising a processor configured to perform the following functions: extracting azimuth, distance, and elevation/depression angle information at a plurality of locations of the reference surface and estimating an inclination angle of the particular surface with respect to the reference surface.

7. A method of detecting a target object, comprising:
discharging a transmission beam with frequencies corresponding to elevation/depression angles with respect to a particular surface, the transmission beam being discharged at various azimuths; and
receiving a reflection echo from a reflective body with an antenna, an elevation/depression angle of the reflective body being detected based on a frequency component of a reception signal received by the antenna, and a distance of the reflective body being detected based on a time component of the reception signal;
discriminating a reference surface from among the reflective bodies based on azimuth, distance and elevation/depression angle information of the reflective bodies; and
discriminating a target object from among the reflective bodies by extracting, based on azimuth, distance and elevation/depression angle information of the reflective bodies, reflective bodies that are located above the reference surface.

8. The method of claim 7, wherein the step of receiving the reflection echo comprises selecting one or some of the reception signals within a particular elevation/depression angle range to detect a target object.

9. The method of claim 7, wherein the step of discharging the transmission beam comprises discharging the transmission beams at various azimuths while rotating the antenna around a rotational shaft perpendicular to the particular surface; and
wherein the step of receiving the reflection echo comprises extracting azimuth, distance, and elevation/depression angle information at a plurality of locations of a reference surface from the reception signal, estimating an inclination angle of the particular surface with respect to the reference surface, and correcting the elevation/depression angle of the reflective body based on the inclination angle.

* * * * *